US012569757B1

(12) United States Patent
Zheng

(10) Patent No.: US 12,569,757 B1
(45) Date of Patent: Mar. 10, 2026

(54) METHOD FOR PROCESSING VIRTUAL ITEM, AND ELECTRONIC DEVICE AND STORAGE MEDIUM THEREOF

(71) Applicant: NETEASE (HANGZHOU) NETWORK CO., LTD., Zhejiang (CN)

(72) Inventor: Peng Zheng, Zhejiang (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 288 days.

(21) Appl. No.: 18/565,550

(22) PCT Filed: Mar. 15, 2022

(86) PCT No.: PCT/CN2022/081016
§ 371 (c)(1),
(2) Date: Nov. 30, 2023

(87) PCT Pub. No.: WO2022/252748
PCT Pub. Date: Dec. 8, 2022

(30) Foreign Application Priority Data

Jun. 3, 2021 (CN) .......................... 202110618032.8

(51) Int. Cl.
*A63F 13/40* (2014.01)
*A63F 13/85* (2014.01)
(52) U.S. Cl.
CPC .............. *A63F 13/40* (2014.09); *A63F 13/85* (2014.09)
(58) Field of Classification Search
CPC .... A63F 13/20; A63F 13/2145; A63F 13/533; A63F 13/537; A63F 13/5372; A63F 13/55; A63F 13/60; A63F 13/63; A63F 13/70; A63F 13/79; A63F 13/822; A63F 2300/305; A63F 2300/306; A63F 2300/575; A63F 2300/807
See application file for complete search history.

(56) References Cited

U.S. PATENT DOCUMENTS

2004/0266505 A1* 12/2004 Keam ................... A63F 13/533
                                                              463/1
2013/0005475 A1* 1/2013 Mahajan ................ A63F 13/85
                                                              463/42
(Continued)

FOREIGN PATENT DOCUMENTS

CN      107291353 A      10/2017
CN      107899237 A      4/2018
(Continued)

OTHER PUBLICATIONS

1st Office Action dated Oct. 28, 2023 of Chinese Application No. 202110618032.8.
(Continued)

*Primary Examiner* — Omkar A Deodhar
(74) *Attorney, Agent, or Firm* — Qinghong Xu

(57) ABSTRACT

A method and an apparatus for processing a virtual item, device and a storage medium are provided. The method includes, displaying a graphical user interface including a storage space interface of the virtual item on a terminal device: displaying a virtual item button for controlling the virtual item in the storage space interface; displaying prompt information of the virtual item button; where the prompt information is configured to prompt a user to slide from an operation range of the virtual item button towards a preset direction, to transfer the virtual item from a current storage space to another storage space; and in response to detecting a slide operation where a finger of the user slides from the operation range towards the preset direction, and in response to determining that a parameter of the slide operation conforms to a preset parameter, transferring the virtual item.

20 Claims, 7 Drawing Sheets backpack please slide towards a lower left of a to-be-transferred item range, to transfer the item to the warehouse

| virtual item1 ⓦ | virtual item2 ⓦ | virtual item3 ⓦ | virtual item4 ⓦ | virtual item5 ⓦ |
|---|---|---|---|---|
| virtual item6 ⓦ | virtual item7 ⓦ | virtual item8 ⓦ | virtual item9 ⓦ | |
| | | | | |

W: warehouse

(56)        References Cited

U.S. PATENT DOCUMENTS

| | | | | |
|---|---|---|---|---|
| 2014/0282162 A1* | 9/2014 | Fein | .................... | G06F 3/0486 |
| | | | | 715/810 |
| 2015/0100615 A1* | 4/2015 | Irani | ................. | G06F 21/6236 |
| | | | | 709/201 |
| 2019/0099674 A1* | 4/2019 | Yu | .......................... | A63F 13/69 |
| 2019/0282903 A1* | 9/2019 | Brody | ................... | G06Q 10/10 |
| 2021/0245054 A1* | 8/2021 | Lee | ........................ | A63F 13/80 |

FOREIGN PATENT DOCUMENTS

| | | | |
|---|---|---|---|
| CN | 108176054 A | 6/2018 |
| CN | 108459811 A | 8/2018 |
| CN | 110420453 A | 11/2019 |
| CN | 111701233 A | 9/2020 |
| CN | 111701237 A | 9/2020 |
| CN | 112044071 A | 12/2020 |
| CN | 112190922 A | 1/2021 |
| CN | 112516583 A | 3/2021 |
| CN | 113244611 A | 8/2021 |
| JP | 2017162272 A | 9/2017 |
| WO | 2020114275 A1 | 6/2020 |

OTHER PUBLICATIONS

International Search Report dated Jun. 14, 2022 of International Application No. PCT/CN2022/081016.
Notice of Allowance dated Dec. 15, 2023 for Chinese Application No. 202110618032.8.

\* cited by examiner

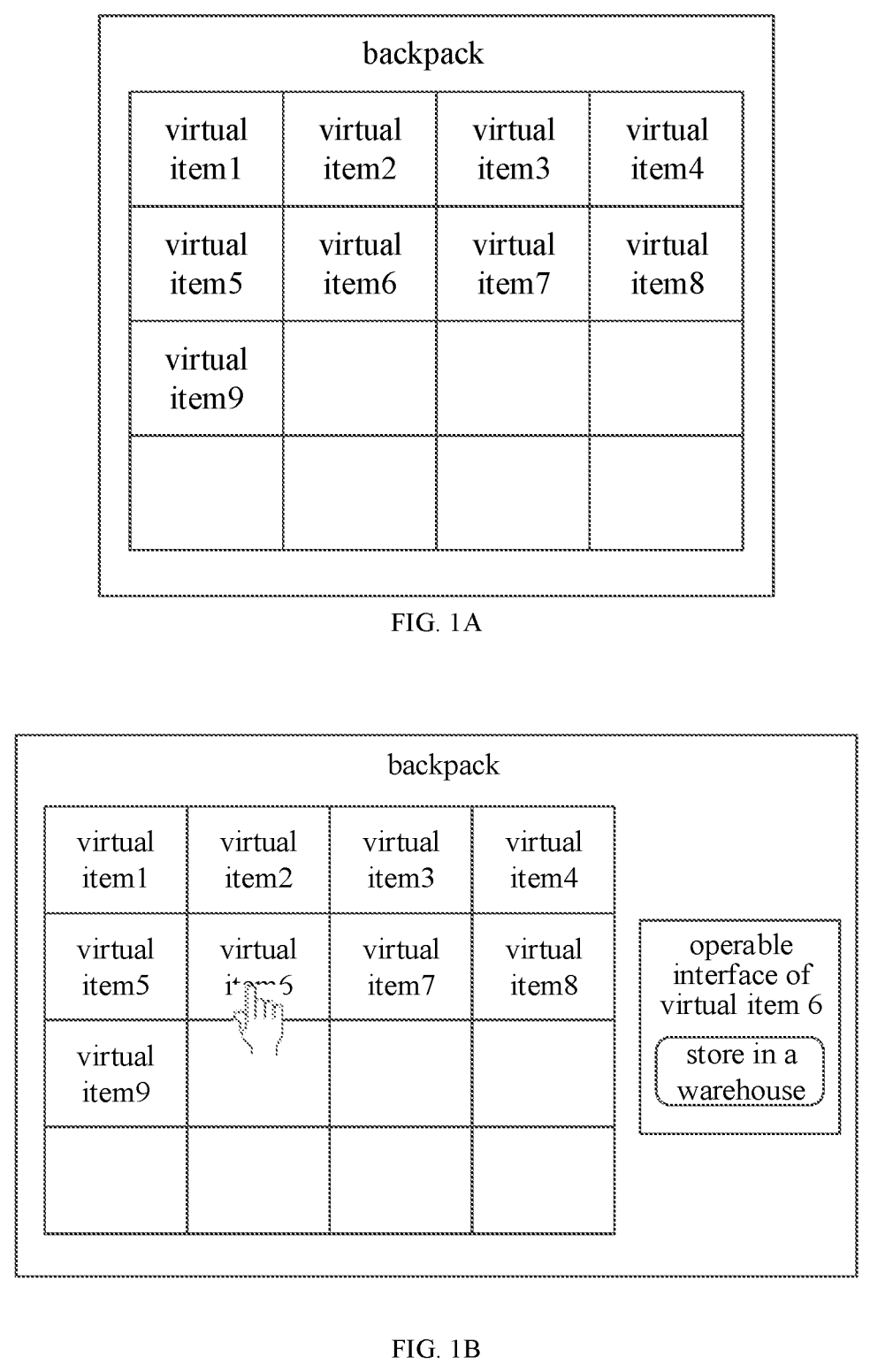

| backpack | | | |
|---|---|---|---|
| virtual item1 | virtual item2 | virtual item3 | virtual item4 |
| virtual item5 | virtual item6 | virtual item7 | virtual item8 |
| virtual item9 | | | |
| | | | |

FIG. 1A

| backpack | | | | |
|---|---|---|---|---|
| virtual item1 | virtual item2 | virtual item3 | virtual item4 | |
| virtual item5 | virtual item5 | virtual item7 | virtual item8 | operable interface of virtual item 6 |
| virtual item9 | | | | store in a warehouse |
| | | | | |

FIG. 1B

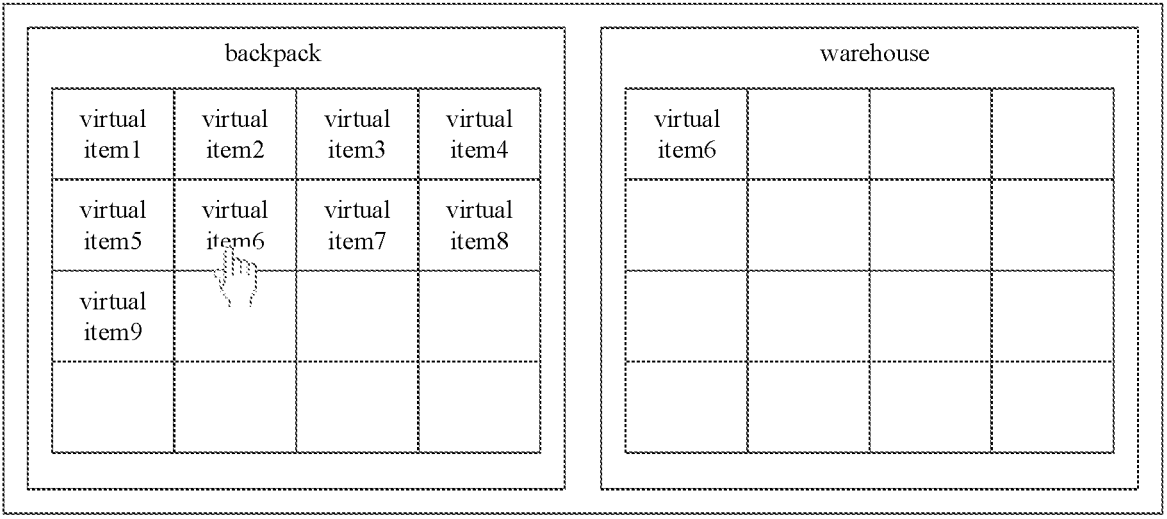

| backpack | | | |
|---|---|---|---|
| virtual item1 | virtual item2 | virtual item3 | virtual item4 |
| virtual item5 | virtual item6 | virtual item7 | virtual item8 |
| virtual item9 | | | |
| | | | |

| warehouse | | | |
|---|---|---|---|
| virtual item6 | | | |
| | | | |
| | | | |
| | | | |

FIG. 1C

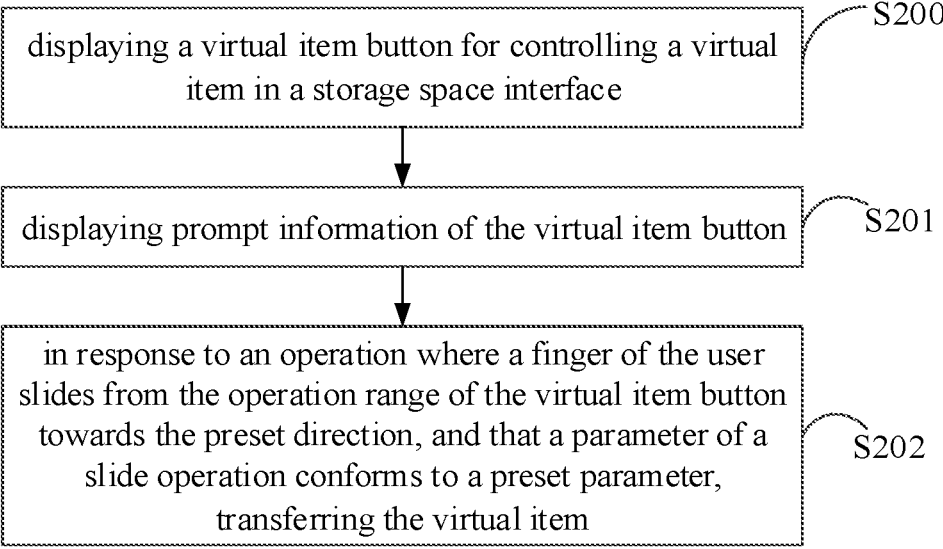

displaying a virtual item button for controlling a virtual item in a storage space interface — S200 displaying prompt information of the virtual item button — S201 in response to an operation where a finger of the user slides from the operation range of the virtual item button towards the preset direction, and that a parameter of a slide operation conforms to a preset parameter, transferring the virtual item — S202

FIG. 2

W: warehouse

W: warehouse

S601 acquiring a pressing duration of the user on the virtual item button

S602 if the pressing duration is greater than or equal to a preset duration, displaying the prompt information of the virtual item button

S603 if the pressing duration is less than the preset duration, not displaying the prompt information of the virtual item button virtual item6 virtual item6

METHOD FOR PROCESSING VIRTUAL ITEM, AND ELECTRONIC DEVICE AND STORAGE MEDIUM THEREOF

CROSS-REFERENCE

The present disclosure is the U.S. National Phase Application of PCT International Application No. PCT/CN2022/081016, filed on Mar. 15, 2022, which is based on and claims priority to Chinese Patent Application No. 202110618032.8, entitled "METHOD AND APPARATUS FOR PROCESSING VIRTUAL OBJECT, AND DEVICE AND STORAGE MEDIUM", filed on Jun. 3, 2021, the entire content of both of which are incorporated herein by reference for all purposes.

TECHNICAL FIELD

The present disclosure relates to a field of game technology, and more particularly, to a method and an apparatus for processing a virtual item, device and a storage medium.

BACKGROUND

There are a large number of virtual items in the game, which are stored in a plurality of storage spaces. In some scenarios, a user needs to transfer a virtual item from one storage space to another.

At present, one manner to transfer the virtual item is to click a virtual item button in a current storage space interface to call out an operable interface of the virtual item, afterward, select the virtual item to be transferred in the operable interface, and then click a "store in a warehouse" button. In some other manners, in order to transfer the virtual item, interfaces of two storage spaces are displayed at the same time, and the user transfers the virtual item from the current storage space to another storage space by dragging, and the virtual item button is double-clicked, or a "store in a warehouse" button is provided in the current storage space interface, the user clicks the "store in a warehouse" button once, and then clicks the virtual item to be transferred in the current storage space.

However, the above operation manners for transferring the virtual item have operational inconvenient problems, such as too many operation steps, a need to display two interfaces at the same time, and the fact that a double-click operation is usually given other control functions, and the like.

It should be noted that the above-mentioned information disclosed in the Background section is only used to enhance the understanding of the background of the present disclosure, and therefore it may include information that does not constitute the information of the related art known to those skilled in the art.

SUMMARY

In a first aspect, the present disclosure provides a method for processing a virtual item, including: displaying a graphical user interface on a terminal device, where the graphical user interface includes a storage space interface of the virtual item; displaying a virtual item button for controlling the virtual item in the storage space interface; displaying prompt information of the virtual item button; where the prompt information is configured to prompt a user to slide from an operation range of the virtual item button towards a preset direction, to transfer the virtual item corresponding to the virtual item button from a current storage space to another storage space; and in response to detecting a slide operation where a finger of the user slides from the operation range of the virtual item button towards the preset direction, and in response to determining that a parameter of the slide operation conforms to a preset parameter, transferring the virtual item.

In a third aspect, the present disclosure provides an electronic device including: a processor, a memory configured to store executable instructions of the processor, and an interactive interface; where the processor is configured, when performing the executable instructions, to execute the method of the first aspect.

In a fourth aspect, the present disclosure provides a non-transitory computer-readable storage medium having computer execution instructions stored thereon, where the computer execution instructions, when executed by a processor, implement the method of the first aspect.

It should be understood that the above general description and the following detailed description are only exemplary and explanatory and should not limit the present disclosure.

BRIEF DESCRIPTION OF THE DRAWINGS

The drawings herein are incorporated into the specification and constitute a part of the specification, show embodiments that conform to the present disclosure, and together with the specification are to explain the principle of the present disclosure.

FIG. 1A is a schematic diagram of a backpack interface according to an embodiment of the present disclosure;

FIG. 1B is a schematic diagram of an operable interface of a virtual item in a backpack according to an embodiment of the present disclosure;

FIG. 1C is an interface diagram for transferring a virtual item by dragging according to an embodiment of the present disclosure;

FIG. 2 is a flowchart I of a method for processing a virtual item according to an embodiment of the present disclosure;

Figure 3:
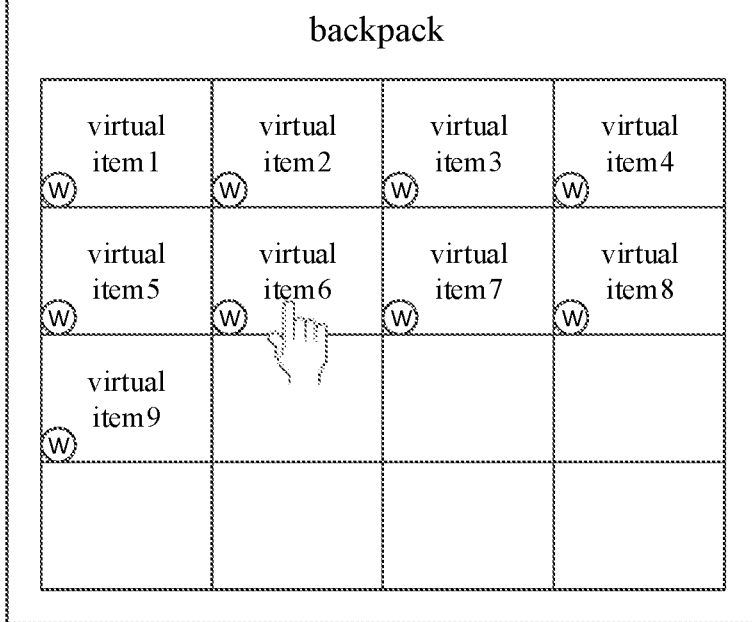
FIG. 3 is an example diagram in which prompt information is an icon according to an embodiment of the present disclosure.

The above drawings have shown clear embodiments of the present disclosure, and will be described in more detail hereinafter. These drawings and written descriptions are not intended to limit the scope of the present disclosure by any means, but rather to illustrate the concepts of the present disclosure to those skilled in the art by reference to specific embodiments.

DETAILED DESCRIPTION

Example embodiments are described in detail herein, and examples thereof are shown in accompanying drawings. When the following description relates to the accompanying drawings, unless otherwise specified, same numbers in different accompanying drawings represent same or similar elements. Implementations described in the following example embodiments do not represent all implementations consistent with the present disclosure. On the contrary, they are only examples of apparatuses and methods that are described in the appended claims in detail and that are consistent with some aspects of the present disclosure.

There are a large number of buttons on a user interface (UI) of a game, each button corresponds to a variety of operation manners, such as a click, a long-press, a dragging, a double-click, and the like, and each operation manner for each button is given a certain game function to indicate different intentions of a game player (hereinafter referred to as a user).

There are many virtual items included in the game, and these virtual items may provide convenience for the user, such as a prop in the game. These virtual items may be placed in different storage spaces according to the user's requirement. However, the user's requirement may change, and thus the user often transfers the virtual item from one storage space to another storage space.

In some scenarios, it is common for the game to have a plurality of backpack systems (hereinafter referred to as backpacks), to store different kinds of the virtual items. In addition, many games may also have a warehouse system (hereinafter referred to as a warehouse), which is also used to store different kinds of the virtual items. The user may place some commonly used virtual items into the backpack and place some less commonly used virtual items into the warehouse. FIG. 1A is a schematic diagram of a backpack interface according to an embodiment of the present disclosure.

As shown in FIG. 1A, the backpack interface includes a plurality of buttons, each rectangular box in FIG. 1A is one button for the virtual item, and each button corresponds to one commonly used virtual item held by the game player. In addition, many games have one warehouse, a warehouse interface is similar to the backpack interface and also includes a plurality of buttons, and each button corresponds to one less commonly used virtual item held by the game player.

In some other scenarios, the game also provides a function for selling the virtual items and a function for running a stall, which also requires the transfer of the virtual items.

The following is an introduction to the transfer of the virtual items, by using an example of taking out the virtual item from the backpack and then storing it in the warehouse. Specifically, there are four ways as follows:

In a first implementation, the user needs to click the virtual item button in the backpack interface to invoke the operable interface of the virtual item.

FIG. 1B is a schematic diagram of an operable interface of a virtual item in a backpack according to an embodiment of the present disclosure.

As shown in FIG. 1B, the operable interface includes a "store in a warehouse" button (the button to store the virtual item in the warehouse). After that, the user clicks the "store in a warehouse" button in the operable interface to transfer the virtual item from the backpack to the warehouse.

For one virtual item, the above operation manner requires two click operations, and the introduction of the operable interface is required, which is cumbersome. If a large number of virtual items need to be transferred from the backpack to the warehouses, this redundant operation reduces the user experience.

In a second implementation, many games transfer the virtual item in the backpack to the warehouse by dragging.

FIG. 1C is an interface diagram for transferring a virtual item by dragging according to an embodiment of the present disclosure.

As shown in FIG. 1C, the interface includes a backpack interface and a warehouse interface, and the user may transfer the virtual item in the backpack to the warehouse by dragging.

In this way, the backpack interface and the warehouse interface need to be displayed at the same time, while a screen in a mobile game is relatively small, it is difficult for the terminal device to display the backpack interface and the warehouse interface at the same time, and the aesthetic appearance of the interface is affected. In addition, the virtual item is dragged from the backpack interface to the warehouse interface, resulting in a relatively long moving distance; if the plurality of the virtual items are transferred, a plurality of long-distance dragging operations are required, which is inconvenient.

In a third implementation, some games implement to store the virtual item in the backpack into the warehouse by double-clicking the virtual item button, and the operation is easy and the screen is not occupied. However, the double-click in the game is usually given to another function, which is to use the item immediately, and thus this operation manner is not adopted by most games.

In a fourth implementation, the "store in a warehouse" button needs to be placed on the backpack interface. The user needs to click the "store in a warehouse" button once, then click the button of the virtual item to be transferred in the backpack, and the virtual item may be stored in the warehouse. This implementation still requires two clicks, and in order to distinguish them from clicking the virtual item button in the backpack, the "store in a warehouse" button needs to be clicked several times. Thus, the operation is still relatively cumbersome.

To sum up, the current manners for transferring the virtual item have many operational inconvenient problems, such as too many operations, and the need to display a plurality of interfaces.

Regarding the above technical problems, the inventor of the present disclosure proposes the following technical concept: in the game, the user may perform the following operations, which include: click, double-click, drag, and slide. At present, both the click operation and the double-click operation for the virtual item button are given corresponding game functions, while the dragging is more laborious for the user in practice. Thus, the present disclosure uses a slide operation as an operation for transferring the virtual item, and prompt information is displayed on the storage space interface of the terminal device, so as to prompt the user how to perform the transfer of the virtual item. In case that the slide operation of the user meets a preset condition, the operation for transferring the virtual item is performed. In this way, for the user, only one slide operation is required to achieve the transfer of the virtual item, and for the terminal device, there is no need to display two interfaces at the same time. Thus, a convenient operation manner for transferring the virtual item may be provided, so as to provide the user with operational convenience.

The following is a detailed description of the method for processing the virtual item according to the present disclosure in combination with the accompanying drawings and specific embodiments. The following several specific embodiments may be combined, and the same or similar concept or process may not be described repeatedly in some embodiments.

FIG. 2 is a flowchart I of a method for processing a virtual item according to an embodiment of the present disclosure. As shown in FIG. 2, the method for processing the virtual item in the embodiment includes the following steps S200 to S202:

in step S200, a virtual item button for controlling the virtual item is displayed in the storage space interface.

The method in the present embodiment may be executed by a server, which may be a single server or a cluster of servers including a plurality of servers.

The server communicates with the terminal device, and the terminal device may be a smart phone, a computer, an iPad and other electronic devices. The terminal device may display a graphical user interface (GUI) and provide a human-computer interaction function for the user. The server may send the display content to be displayed to the terminal device for the display on the terminal device.

The server may control the terminal device to display the storage space interface of the virtual item on the graphical user interface of the terminal device, and the storage space interface includes a virtual item button for the user to control the virtual item. The user may control the virtual item by operating the virtual item button, for example, the transfer of the virtual item.

In step S201, prompt information of the virtual item button is displayed.

The prompt information is configured to prompt a user to slide from an operation range of the virtual item button towards a preset direction, to transfer the virtual item corresponding to the virtual item button from a current storage space to another storage space. The user slides from the operation range of the virtual item button towards the preset direction, which may be understood that a starting operation point of the finger of the user is located within the operation range of the virtual item button, which starts from the operation range of the virtual item button and slides towards the preset direction.

The operation range of the virtual item button may be understood as an effective touch region of the virtual item button, and the operation performed by the user within the operation range of the virtual item button is regarded as an operation on the virtual item button.

In some embodiments, the prompt information may be to transfer the virtual item from the backpack to the warehouse, or to transfer the virtual item from the warehouse to the backpack, or to transfer the virtual item in the backpack or the warehouse to a stall interface, or to transfer the virtual item in the backpack or the warehouse to a selling interface of the virtual item.

Please continue to refer to FIG. 1A, each rectangular box in FIG. 1A is one virtual item button, and a region shown in the rectangular box in the drawing is the operation range of the virtual item button.

In the present embodiment, the prompt information may be arranged within or outside the operation range of the virtual item button.

In step S202, in response to an operation where a finger of the user slides from the operation range of the virtual item button towards the preset direction, and that a parameter of a slide operation conforms to a preset parameter, the virtual item is transferred.

In the present embodiment, the prompt information is displayed in the storage space interface, the user slides from the operation range of the virtual item button towards the preset direction according to the prompt information, the terminal device detects the slide operation of the finger of the user in real-time and acquires the parameter of the slide operation, determines whether the parameter of the slide operation conforms to the preset parameter, and sends a determination result to the server, if the slide operation is a slide from the operation range of the virtual item button to the preset direction, and the parameter of the slide operation conforms to the preset parameter, the server controls the terminal device to no longer display the icon of the virtual item in the current storage space interface of the terminal device, and to display the icon of the virtual item in another storage space interface.

In some embodiments, the terminal device detects the slide operation of the finger of the user in real-time, acquires the parameter of the slide operation and sends it to the server, the server determines whether the parameter of the slide operation conforms to the preset parameter, if the slide operation is a slide from the operation range of the virtual item button to the preset direction, and the parameter of the slide operation conforms to the preset parameter, the icon of the virtual item is no longer displayed in the current storage space interface of the terminal device, and the icon of the virtual item is displayed in another storage space interface.

In the present embodiment, the storage space interface including the virtual item is displayed on the terminal device, the virtual item button for controlling the virtual item and the prompt information of the virtual item button are displayed on the storage space interface, the prompt information is configured to prompt a user to slide from the operation range of the virtual item button towards the preset direction, to transfer the virtual item corresponding to the virtual item button from the current storage space to another storage space; and when the finger of the user is detected to slide from the operation range of the virtual item button towards the preset direction, and the parameter of the slide operation conforms to the preset parameter, the virtual item is transferred. In the present embodiment, the user merely performs one slide operation to achieve the transfer of the virtual item, and the slide operation is from the operation range of the virtual item button towards the preset direction. Thus, compared with displaying two interfaces on the terminal device at the same time and dragging the virtual item from one interface to another storage space, the finger of the user moves less distance and there is no need to display two interfaces. For the user, the operation is simple and less frequent, which may also reduce the complexity of the operation when a large number of virtual items need to be transferred.

The storage space interface of the terminal device has display content. For the user, the visual experience may be different depending on the location of the prompt information on the storage space interface. No matter where the prompt information is set, it is necessary to ensure that the prompt information does not block the icon of the virtual object. A display location of the prompt information may also be determined according to a type of the prompt information. The following describes how to display different types of the prompt information.

In some embodiments, the type of the prompt information includes text, an icon and an animated image; the display contents of the text, the icon and the animated image are different, and their proportions in the storage space interface are also different. Thus, according to the type of the prompt information, it may be determined whether the prompt information is displayed within the operation range of the virtual item button or outside the operation range of the virtual item button. Specifically, the text may be displayed outside the operation range of the virtual item button, and the icon and animated image may be displayed within the operation range of the virtual item button.

For the icon, it may be arranged within the operation range of the virtual item button, the preset direction is a target direction or a direction whose an included angle with the target direction is less than a preset angle, where the target direction is a direction of the icon relative to a center of the virtual item button. In some examples, the icon may be arranged in an upper left corner, a lower left corner, an upper right corner and a lower right corner of the operation range of the virtual item button. The icon may provide the user with an orientation for the slide operation, to prompt the user to slide towards a location where the icon is located. In practical application, if the user is prone to slide towards the direction of the lower left corner, the icon is arranged at the lower left corner of the operation range of the virtual item button. Accordingly, the preset direction is the lower left direction of the operation range of the virtual item button.

FIG. 3 is an example diagram in which prompt information is an icon according to an embodiment of the present disclosure. As shown in FIG. 3, the icon is arranged in the lower left corner of the operation range of the virtual item button. The user slides to the lower left corner of the operation range of the virtual item button, and in case that the slide parameter meets the preset parameter, the terminal device automatically performs the operation of transferring the virtual item from the current storage space to another storage space.

For the animated image, it may show an action of sliding towards the preset direction. The animated image may also be arranged in the upper left corner, the lower left corner, the upper right corner and the lower right corner of the operation range of the virtual item button. The animated image may provide the user with an orientation for the slide operation, to prompt the user to slide towards a location where the icon is located. In practical application, if the user is prone to slide towards the lower left, the animated image may be arranged at the lower left corner of the operation range of the virtual item button. Accordingly, the preset direction is the lower left direction of the operation range of the virtual item button.

Figure 4:
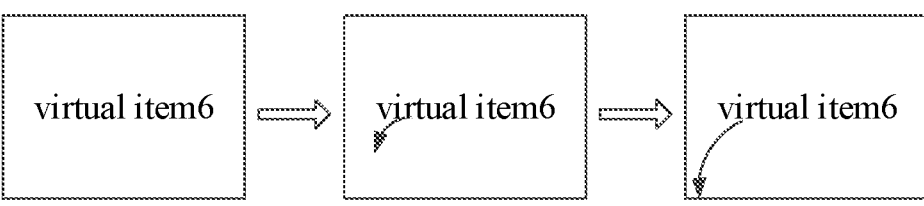
FIG. 4 is an example diagram in which prompt information is an animated image according to an embodiment of the present disclosure.

FIG. 4 is an example diagram in which prompt information is an animated image according to an embodiment of the present disclosure. As shown in FIG. 4, a left side of a left outline arrow in the drawing is provided with an initial state diagram of the animated image, as shown, in the initial state, a blank image without any arrow is shown; a right side of the left outline arrow is provided with a middle state diagram of the animated image, as shown, in the middle state, an arrow with a length of L1 is shown; a right side of a right outline arrow is provided with a final state diagram of the animated image, as shown, in the final state, an arrow with a length of L2 is shown. The animated image is displayed sequentially and repeatedly according to the three state diagrams shown from left to right in FIG. 4. It should be understood that the present embodiment splits the animated image into three state diagrams for the convenience of understanding. In the actual display effect, the animated image should be an arrow with a gradient display.

For the text, since the content to be displayed is relatively long, if the text is displayed within the operation range of the virtual item button, the icon of the virtual item may be blocked. Thus, the text may be arranged outside the operation range of the virtual item button.

Figure 5:
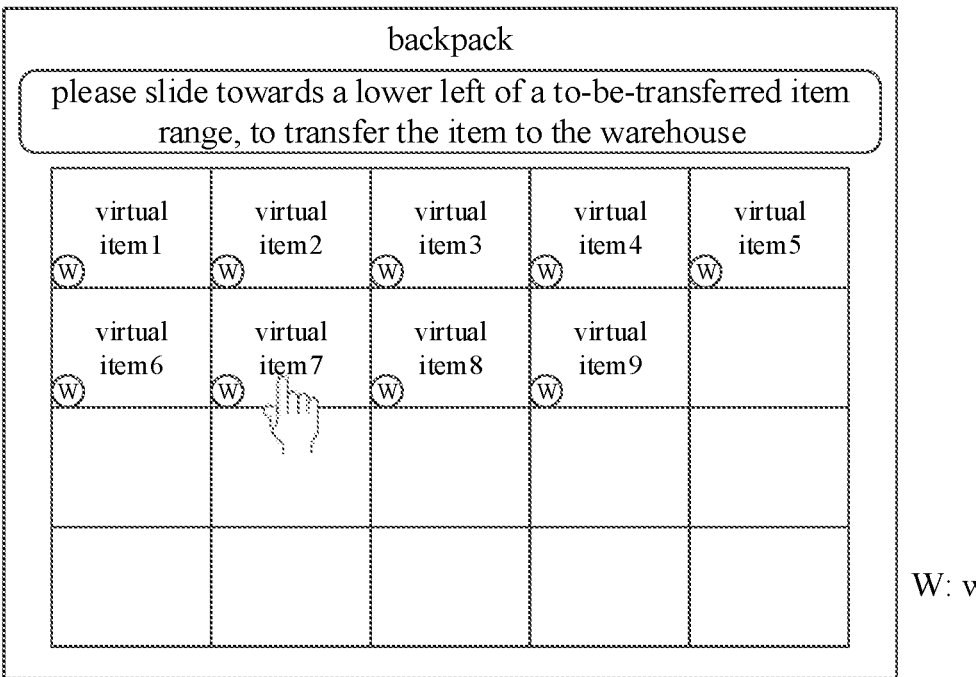
FIG. 5 is an example diagram in which prompt information is text according to an embodiment of the present disclosure.

FIG. 5 is an example diagram in which prompt information is text according to an embodiment of the present disclosure. As shown in FIG. 5, taking the transfer of the item from the backpack to the warehouse as an example, the text content is "please slide towards a lower left of a to-be-transferred item range, to transfer the item to the warehouse". The text content may be set at any blank location of the backpack interface.

Among the above three types of the prompt information, any one type of the prompt information may be displayed, or two types of the prompt information may be displayed at the same time, for example, the text and the icon are displayed at the same time, or the text and the animated image are displayed at the same time.

The user may perform the slide operation within the operation range of the virtual item button, and some slide operations may be an invalid slide, such as a slide operation performed by the user due to a false touch. In order to distinguish from the invalid slide, the present embodiment is provided with the following forms of the preset parameter, and detects the slide operation in real-time to acquire the slide parameter of the slide operation, if the user performs the slide operation from the operation range of the virtual item button, and the parameter of the slide operation conforms to the preset parameter, the operation of transferring the virtual item is performed.

Several forms of the preset parameter are described in detail below:

In an embodiment, the preset parameter may be a preset slide distance. Accordingly, in response to the operation where the finger of the user slides from the operation range of the virtual item button towards the preset direction, and that the parameter of the slide operation conforms to the preset parameter, transferring the virtual item includes: in response to the operation where the finger of the user slides from the operation range of the virtual item button towards the preset direction, and that a slide distance is greater than or equal to the preset slide distance, transferring the virtual item.

In the present embodiment, the slide distance refers to a distance between a location of an initial touch point and a location of a current touch point of the finger of the user on the storage space interface of the terminal device. A location of each detected touch point is recorded as $(x_i, y_i)$, it is assumed that a location of a previously detected touch point is $(x_0, y_0)$ and a location of a current touch point is $(x_1, y_1)$, thus, the slide distance $d=\sqrt{(dx^2+dy^2)}$, where $dx=x_1-x_0$, $dy=y_1-y_0$. It is assumed that a preset slide distance is $d_0$, if $dx<=0$ and $dy<=0$, it means that the current touch point is located at the lower left of the previously detected touch point; if $d>d_0$, it means that the slide distance is greater than the preset slide distance, and the operation of transferring the virtual item is performed.

In some scenarios, if the finger of the user slides towards the lower left direction, a distance $d$ of this slide to the lower left direction, i.e., a distance between a location of the touch point when the user initially slides downwards and a location of the current touch point, is calculated. If $d>d_0$, this operation is regarded as the operation of storing the backpack item into the warehouse. For other cases other than the above case, they are regarded as the invalid operation. Specifically, the following situations are included:

if the finger of the user slides in a direction other than the preset direction, it is determined as the invalid operation.

If a distance that the finger of the user slides towards the lower left direction does not exceed the preset slide distance, it is also determined as the invalid operation.

On the basis of determining that it is the invalid operation, it may continue to determine the slide condition of the finger of the user, and that is, continue to detect the slide operation, acquire the slide distance of the slide operation, and determine whether the slide distance is greater than the preset slide distance.

In some other scenarios, if the user releases the finger and terminates the slide operation, the operation is determined as a click operation on the virtual item button.

On the basis of the above embodiments, if the operation is determined as a transfer operation of the virtual item, there is no response to a subsequent operation of the user. That is, once the condition for the transfer operation of the virtual object is met during the finger slides, then when the user continues to slide or releases the finger, both are determined as the invalid operations.

The present embodiment may be understood as: in the case that the user long-presses the virtual item button, the finger of the user moves slightly from the operation range of the virtual item button to the lower left, and the operation of transferring the virtual item is thus triggered.

In another embodiment, the preset parameter may be a preset slide duration. Accordingly, in response to the operation where the finger of the user slides from the operation range of the virtual item button towards the preset direction, and that the parameter of the slide operation conforms to the preset parameter, transferring the virtual item includes in response to the operation where the finger of the user slides from the operation range of the virtual item button towards the preset direction, and that a slide duration is greater than or equal to the preset slide duration, transferring the virtual item.

In the present embodiment, the slide duration may be converted according to the slide distance, and the slide duration=a slide distance/a slide speed; where the slide speed may be an average value of the slide speeds of a plurality of users.

In another embodiment, the preset parameter may be a preset slide track. Accordingly, in response to the operation where the finger of the user slides from the operation range of the virtual item button towards the preset direction, and that the parameter of the slide operation conforms to the preset parameter, transferring the virtual item includes: in response to the operation where the finger of the user slides from the operation range of the virtual item button towards the preset direction, and that a slide track conforms to the preset slide track, transferring the virtual item. In this case, the icon or the animated image may be the preset slide track, such as a curved line or a line with an arrow. The user may implement the function of transferring the virtual item by sliding along the preset slide track.

Figure 6:
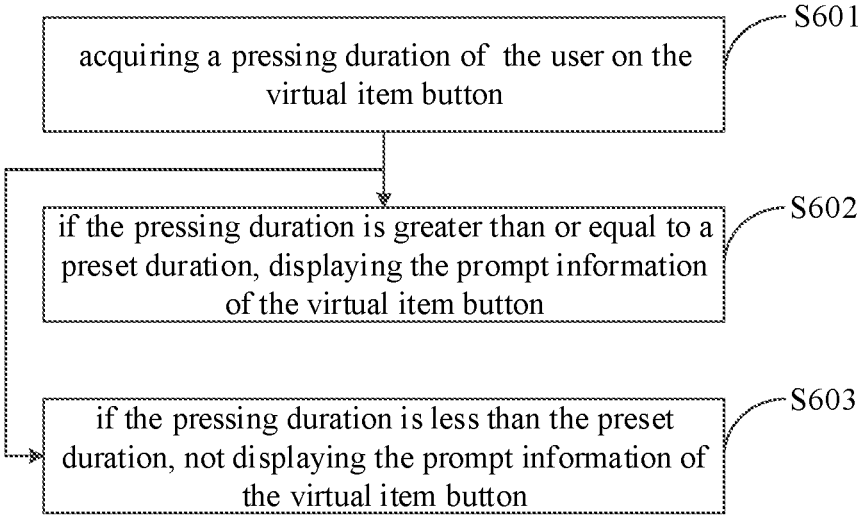
FIG. 6 is a flowchart II of a method for processing a virtual item according to an embodiment of the present disclosure.

On the basis of the above embodiments, FIG. 6 is a flowchart II of a method for processing a virtual item according to an embodiment of the present disclosure. As shown in FIG. 6, the method for processing the virtual item includes the following steps S601 to S603:

in step S601, a pressing duration of the user on the virtual item button is acquired;

in step S602, if the pressing duration is greater than or equal to a preset duration, the prompt information of the virtual item button is displayed;

in step S603, if the pressing duration is less than the preset duration, the prompt information of the virtual item button is not displayed.

The terminal device detects the pressing duration of the finger of the user on the virtual item button in real-time, and sends the pressing duration to the server, the server determines whether the pressing duration is less than the preset duration, and controls the terminal device to display or not display the prompt information of the virtual item button in the storage space interface of the terminal device according to the determination result.

In some embodiments, the terminal device detects the pressing duration of the finger of the user on the virtual item button in real-time, determines whether the pressing duration is less than the preset duration, and then sends the determination result of whether the pressing duration is less than the preset duration to the server, and the server may control the terminal device to display or not display the prompt information of the virtual item button in the storage space interface of the terminal device according to the determination result.

For the virtual item button, the user may perform the following three actions: pressing the button with the finger; sliding the finger on the user interface; releasing the finger.

If the terminal device detects that the finger of the user clicks the virtual item button and the finger is immediately released, the operation is regarded as a click operation, and a control function corresponding to the click operation, such as calling out the operable interface (tips interface) or the detailed operation interface of the virtual item, is performed.

If the terminal device detects that the finger of the user clicks on the virtual item button and the finger is not immediately released, for example, performing an arbitrary slide on the storage space interface, the prompt information of the virtual item button may be displayed to prompt the user for a next determination step of the slide operation.

Based on the above introduction, the present embodiments may preset the preset duration, by detecting the pressing duration of the finger of the user on the virtual item button, to determine whether the finger of the user is immediately released after clicking the virtual item button, thereby determining whether the prompt information needs to be displayed. Specifically, if the finger of the user clicks the virtual item button for less than the preset duration, it is determined that the finger of the user is immediately released; if the time for the finger of the user to click the virtual item button exceeds the preset duration, it is determined that the finger of the user is not immediately released.

It should be noted that the execution orders of the steps S602 and S603 are not limited in the present embodiment.

During the sliding process, the finger of the user may accidentally slide outside the operation range of the virtual item button, then the user re-slides into the operation range of the virtual item button and continues to slide within the operation range of the virtual item button. In this case, it is necessary to continue to detect whether the slide parameter of the slide operation conforms to the preset parameter, and it cannot be determined as the invalid operation. If the finger of the user slides outside the operation range of the virtual item button and the finger is released, it may be directly determined as the invalid operation, and the user may perform misoperation on the virtual item button. Thus, the present disclosure further proposes the following embodiments, specifically including the following step, where:

if it is detected that the finger of the user slides out of the operation range of the virtual item button, re-slides into the operation range of the virtual item button and slides towards the preset direction, in case that a parameter of a slide operation conforms to the preset parameter, the virtual item is transferred;

if it is detected that the finger of the user slides out of the operation range of the virtual item button and the finger is released, the operation is determined as an invalid operation.

In the present embodiment, a stay location of the finger of the user on the screen is referred to as a touch point, and when the finger of the user slides on the screen, the touch point may be any location on the game screen. The present embodiment uses a screen coordinate to represent the location of the touch point, specifically a two-dimensional coordinate (x, y). Since the user initially clicks the virtual item button, the initial touch point stays within the operation range of the virtual item button.

When the user continuously slides the finger, if the touch point falls outside the operation range of the virtual item button, it indicates that the finger of the user has slid outside the operation range of the virtual item button, if the user releases the finger at this time, the operation is neither a click operation nor a transfer operation of the virtual item, but is an invalid operation, and no action is performed. If the user does not release the finger but re-slides from the outside the operation range of the virtual item button into the operation range of the virtual item button, that is, the touch point falls back into the operation range of the virtual item button from the outside the operation range of the virtual item button, and the step of detecting within the range of the virtual item button continues to be performed.

Figures 7, 8:
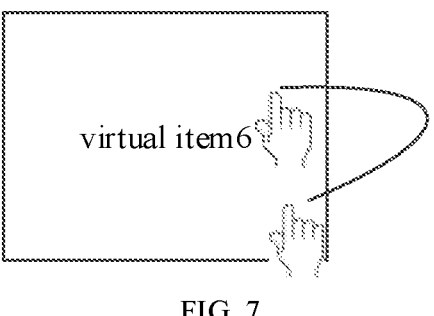
FIG. 7 is a schematic diagram of a sliding manner according to an embodiment of the present disclosure.
FIG. 8 is a schematic diagram of another sliding manner according to an embodiment of the present disclosure.

FIG. 7 is a schematic diagram of a sliding manner according to an embodiment of the present disclosure. As shown in FIG. 7, according to the slide track, it may be seen that the user slides from the operation range of the virtual item button to the outside of the operation range of the virtual item button, then re-slides from the outside of the operation range of the virtual item button into the operation range of the virtual item button, and at this time, the step of detecting within the range of the virtual item button continues to be performed.

FIG. 8 is a schematic diagram of another sliding manner according to an embodiment of the present disclosure. As shown in FIG. 8, according to the slide track, it may be seen that the user slides from the operation range of the virtual item button to the outside of the operation range of the virtual item button, and releases the finger, which is determined as the invalid operation.

In some embodiments, after the virtual item is transferred in response to the operation where the finger of the user slides from the operation range of the virtual item button towards the preset direction, and that the parameter of the slide operation conforms to the preset parameter, the method of the present embodiment may further include the following step, where: the prompt information and an icon of the virtual item corresponding to the virtual item button are hidden.

Specifically, the server controls the terminal device to hide the prompt information and the icon of the virtual item corresponding to the virtual item button in the current storage space interface of the terminal device.

Please continue to refer to FIG. 3, after hiding the prompt information and the icon of the virtual item corresponding to the virtual item button, there is only an empty button without the icon of the virtual item left on the current storage space interface, as shown in a blank rectangular box in FIG. 3.

Figure 9:
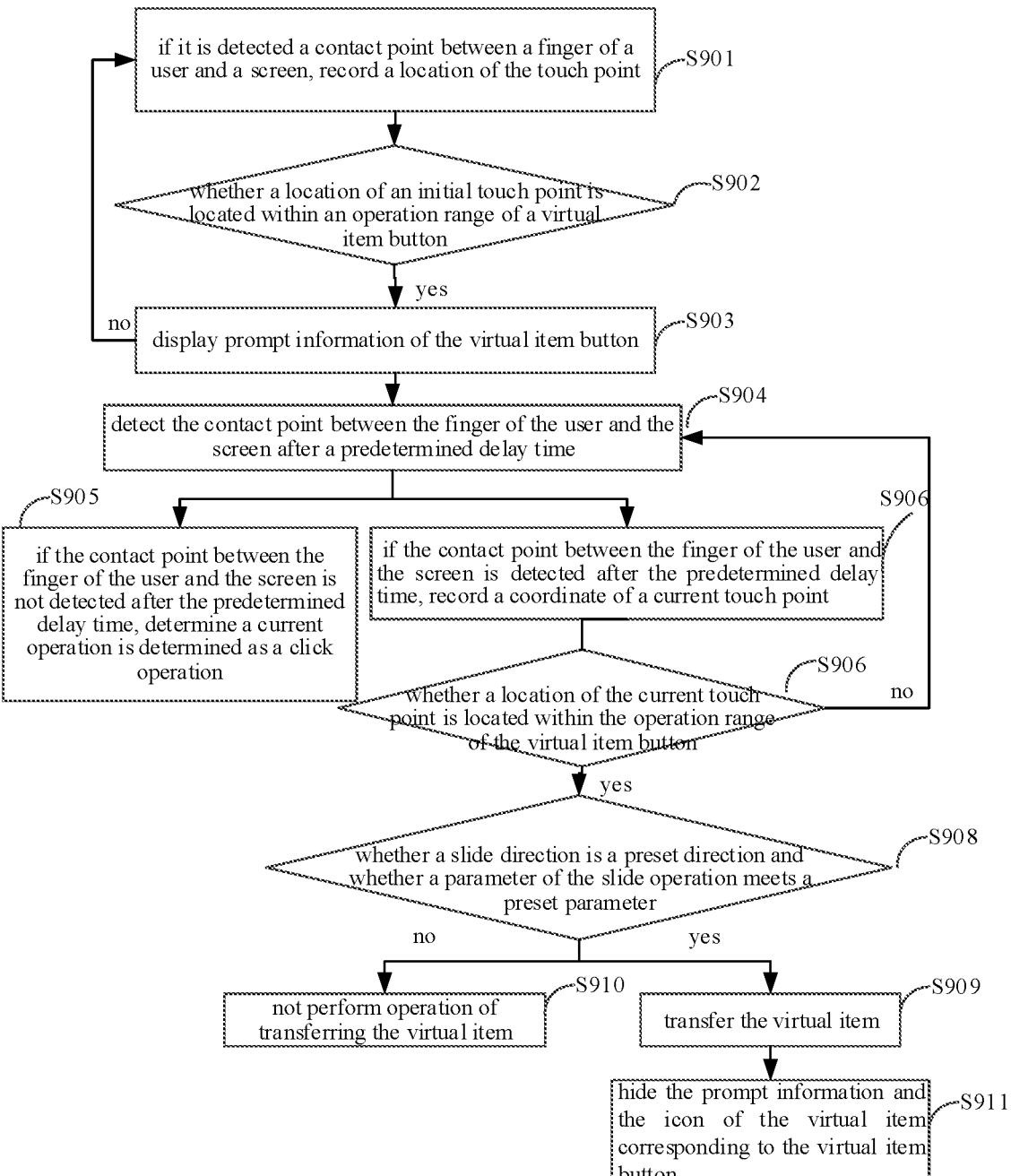
FIG. 9 is a flowchart of an example of a method for processing a virtual item according to an embodiment of the present disclosure.

In order to facilitate understanding, an example is used to describe an embodiment of the present disclosure in detail below:

FIG. 9 is a flowchart of an example of a method for processing a virtual item according to an embodiment of the present disclosure. As shown in FIG. 9, the example includes the following steps S901 to S911:

In S901, if it is detected a touch point between a finger of a user and a screen, a location of the touch point is recorded.

Specifically, the coordinate of the touch point on the screen is recorded as (x, y). If the finger of the user is detected to touch the screen for the first time, the touch point between the finger of the user and the screen is recorded as an initial touch point, a distance for a current slide towards the lower left corner is set to 0, and then step S902 is performed.

In S902, it is determined whether a location of an initial touch point is located within an operation range of a virtual item button;

In S903, if no, return to step S901; if yes, prompt information of the virtual item button is displayed and S904 is performed;

if the location of the initial touch point is located within the operation range of the virtual item button, an icon is displayed in the lower left corner of the virtual item button, to prompt the user to enter the detecting step of the slide operation. A size of the icon may be set to a size of the icon that does not block the virtual item.

In S904, the touch point between the finger of the user and the screen is detected after a predetermined delay time.

In S905, if the touch point between the finger of the user and the screen is not detected after the predetermined delay time, a current operation is determined as a click operation.

If the touch point between the finger of the user and the screen is not detected after the predetermined delay time, it means that the user has released the finger, and thus a current operation is regarded as the click operation.

In S906, if the touch point between the finger of the user and the screen is detected after the predetermined delay time, a coordinate of a current touch point is recorded, and it is determined whether a location of the current touch point is located within the operation range of the virtual item button;

If the touch point between the finger of the user and the screen is detected after the predetermined delay time, it means that the finger of the user is still on the screen, and the coordinate of the current touch point (x1, y1) is recorded.

In S907, if the current touch point is not within the operation range of the virtual item button, return to S904;

In S908, if the current touch point is within the operation range of the virtual item button, it is determined whether a slide direction is a preset direction and whether a parameter of the slide operation meets a preset parameter according to the coordinate of the current touch point and a coordinate of a previous touch point.

In S909, if the slide direction is the preset direction and the parameter of the slide operation meets the preset parameter, the virtual item is transferred.

In S910, if the slide direction is not the preset direction, or, the parameter of the slide operation does not meet the preset parameter, or, the slide direction is not the preset direction and the parameter of the slide operation does not meet the preset parameter, operation of transferring the virtual item is not performed.

Specifically, the coordinate of the previous touch point is recorded as (x0, y0), and the current touch point is recorded as (x1, y1), dx=x1−x0, dy=y1−y0.

If dx<=0 and dy<=0, it means that the current touch point is at the lower left of the previous touch point, and d=√ (dx^2+dy^2).

If dx>0 or dy>0, it means that the finger of the user moves towards another direction, and thus the previously accumulated distance is reset, i.e., d=0.

If distance>25, it is determined as the operation of transferring the virtual item, where 25 is a minimum magnitude limit selected according to experience, to prevent a player from misoperation due to a shaking hand. For cases other than dx<=0, dy<=0 and d>25, S904 is performed after the predetermined delay time, such as 0.03 seconds.

In S911, after transferring the virtual item, the prompt information and the icon of the virtual item corresponding to the virtual item button are hidden.

Specifically, after the virtual item corresponding to the virtual item button is stored in the warehouse from the backpack, a blank button without the icon of the virtual item is left on the storage space interface of the terminal device. In addition, the remaining operations of the finger of the user no longer take effect on the blank button.

Figure 10:
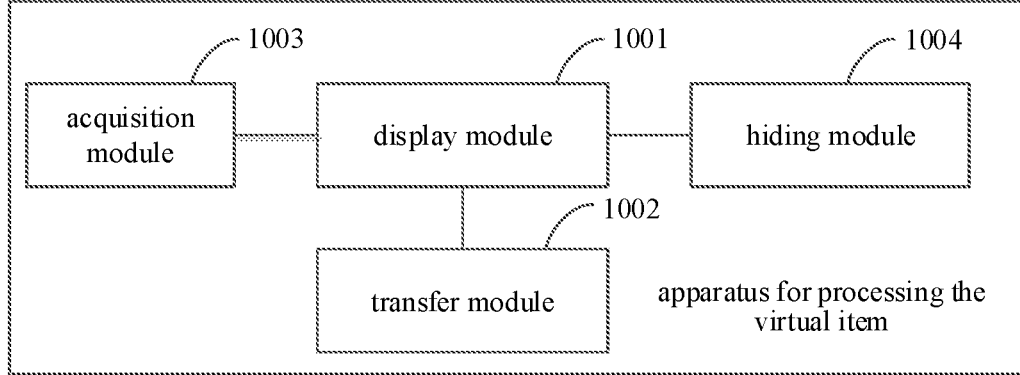
FIG. 10 is a structural diagram of an apparatus for processing a virtual item according to an embodiment of the present disclosure.

On the basis of the above embodiments of the method for processing the virtual item, FIG. 10 is the structural diagram of an apparatus for processing a virtual item according to an embodiment of the present disclosure. The apparatus for processing the virtual item displays a graphical user interface on the terminal device, and the graphical user interface includes a storage space interface of the virtual item, as shown in FIG. 10. The apparatus for processing the virtual item includes: a display module 1001 and a transfer module 1002;

the display module 1001 is configured to display a virtual item button for controlling the virtual item in the storage space interface;

the display module 1001 is further configured to display prompt information of the virtual item button; where the prompt information is configured to prompt a user to slide from an operation range of the virtual item button towards a preset direction, to transfer the virtual item corresponding to the virtual item button from a current storage space to another storage space;

the transfer module 1002 is configured to transfer the virtual item in response to an operation where a finger of the user slides from the operation range of the virtual item button towards the preset direction, and that a parameter of a slide operation conforms to a preset parameter.

In an embodiment, the prompt information includes an icon, the icon is arranged within the operation range of the virtual item button, the preset direction is a target direction or a direction whose an included angle with the target direction is less than a preset angle, and the target direction is a direction of the icon relative to a center of the virtual item button.

In another embodiment, the prompt information includes an animated image, and the animated image is arranged within the operation range of the virtual item button for showing an action of sliding towards the preset direction.

In another embodiment, the prompt information includes text, and the text is arranged outside the operation range of the virtual item button.

In an embodiment, the preset parameter includes any one of a preset slide track, a preset slide duration or a preset slide distance; accordingly, where the transfer module 1002 is specifically configured to in response to the operation where the finger of the user slides from the operation range of the virtual item button towards the preset direction, in case that a slide track conforms to the preset slide track, transfer the virtual item; or, in response to the operation where the finger of the user slides from the operation range of the virtual item button towards the preset direction, in case that a slide duration is greater than or equal to the preset slide duration, transfer the virtual item; or, in response to the operation where the finger of the user slides from the operation range of the virtual item button towards the preset direction, in case that a slide distance is greater than or equal to the preset slide distance, transferring the virtual item.

In one embodiment, the apparatus also includes: an acquisition module 1003;

the acquisition module 1003 is configured to acquire a pressing duration of the user on the virtual item button;

the display module 1001 is configured to display the prompt information of the virtual item button in case that the pressing duration is greater than or equal to a preset duration; and not display the prompt information of the virtual item button in case that the pressing duration is less than the preset duration.

In an embodiment, the transfer module 1002 is configured to, in case that, it is detected that the finger of the user slides out of the operation range of the virtual item button, re-slides into the operation range of the virtual item button and slides towards the preset direction, and that a parameter of a slide operation conforms to the preset parameter, transfer the virtual item; the transfer module 1002 is further configured to, in case that, it is detected an operation where the finger of the user slides out of the operation range of the virtual item button and the finger is released, determine the operation as an invalid operation.

In an embodiment, the apparatus also includes: a hiding module 1004; the hiding module 1004 is configured to hide the prompt information and an icon of the virtual item corresponding to the virtual item button.

The apparatus for processing the virtual item according to the embodiments of the present disclosure may be used to implement the technical solution of the method for processing the virtual item in the above embodiments, and implementations and technical effects of the apparatus are similar to those of the method, which is not repeated herein.

It should be understood that division of the modules of the foregoing apparatus is merely division of logical functions. During actual implementation, all or some of the modules may be integrated into a physical entity, or may be physically separated. Moreover, these modules may be all implemented in a form of software invoked by a processing element, or may be all implemented in a form of hardware, or some modules may be implemented in a form of software invoked by a processing element, and some modules may be implemented in a form of hardware. For example, during implementation, the transfer module 1002 may be a processing element separately disposed, or may be integrated into a chip of the terminal, in addition, the transfer module may be stored in a memory of the terminal as a program that is invoked by a processing element of the terminal to perform a function of the transfer module. Implementation of another module is similar thereto. In addition, all or some of these modules may be integrated, or may be separately implemented. The processing element herein may be an integrated circuit having a signal processing capability. In an implementation process, the steps of the foregoing method or the foregoing modules may be completed by using a hardware-integrated logical circuit in a processor element or an instruction in a form of software.

Figure 11:
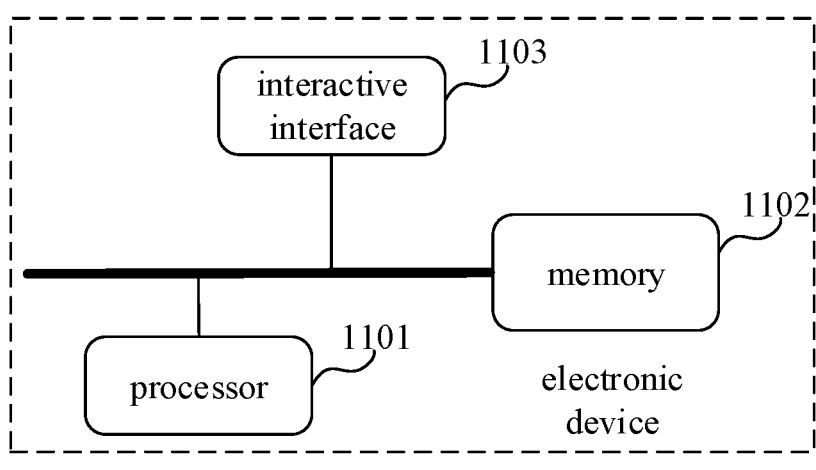
FIG. 11 is a structural diagram of an electronic device according to an embodiment of the present disclosure.

FIG. 11 is a structural diagram of an electronic device according to an embodiment of the present disclosure. As shown in FIG. 11, the terminal device may include: a processor 1101, a memory 1102 and an interactive interface 1103. The electronic device may be a server, which may control the terminal device to display a graphical user interface, and the graphical user interface includes a storage space interface.

The processor 1101 performs computer execution instructions stored in memory, causing the processor 1101 to execute the solution in the above embodiments. The processor 1101 may be a general-purpose processor, including a central processing unit CPU, network processor (NP), and the like; it may also be a digital signal processor DSP, an ASIC, a field programmable gate array FPGA or another programmable logic device, a discrete gate or transistor logic device, and a discrete hardware component.

The memory 1102 is connected with the processor 1101 through a system bus and communicates with each other. The memory 1102 is configured to store computer program instructions.

The interaction interface 1103 is configured to provide a human-computer interaction function for the user.

The system bus may be a peripheral component interconnect (PCI) bus or an extended industry standard architecture (EISA) bus, and the like. The system bus may be divided into an address bus, a data bus, and a control bus and the like. For convenience of representation, only a thick line is used in the drawing, but it does not mean that there is only one bus or one type of bus. The interaction interface is configured to implement communication between the database access device and another computing device (such as a client, a read-write library, and a read-only library). The storage may include a random access memory (RAM) or non-volatile memory.

The electronic device according to the embodiments of the present disclosure may be used to implement the following solution:

displaying a virtual item button for controlling the virtual item in the storage space interface;

displaying prompt information of the virtual item button; where the prompt information is configured to prompt a user to slide from an operation range of the virtual item button towards a preset direction, to transfer the virtual item corresponding to the virtual item button from a current storage space to another storage space; and in response to an operation where a finger of the user slides from the operation range of the virtual item button towards the preset direction, and that a parameter of a slide operation conforms to a preset parameter, transferring the virtual item.

In some embodiments, the prompt information includes an icon, the icon is arranged within the operation range of the virtual item button, the preset direction is a target direction or a direction whose an included angle with the target direction is less than a preset angle, and the target direction is a direction of the icon relative to a center of the virtual item button.

In some embodiments, the prompt information includes an animated image, and the animated image is arranged within the operation range of the virtual item button for showing an action of sliding towards the preset direction.

In some embodiments, the prompt information includes text, and the text is arranged outside the operation range of the virtual item button.

In some embodiments, the preset parameter includes any one of a preset slide track, a preset slide duration or a preset slide distance;

accordingly, where the in response to the operation where the finger of the user slides from the operation range of the virtual item button towards the preset direction, and that the parameter of the slide operation conforms to the preset parameter, transferring the virtual item includes:

in response to the operation where the finger of the user slides from the operation range of the virtual item button towards the preset direction, and that a slide track conforms to the preset slide track, transferring the virtual item;

or in response to the operation where the finger of the user slides from the operation range of the virtual item button towards the preset direction, and that a slide duration is greater than or equal to the preset slide duration, transferring the virtual item;

or in response to the operation where the finger of the user slides from the operation range of the virtual item button towards the preset direction, and that a slide distance is greater than or equal to the preset slide distance, transferring the virtual item.

In some embodiments, the solution further includes:

acquiring a pressing duration of the user on the virtual item button;

if the pressing duration is greater than or equal to a preset duration, displaying the prompt information of the virtual item button;

if the pressing duration is less than the preset duration, not displaying the prompt information of the virtual item button.

In some embodiments, the solution further includes:

if it is detected that the finger of the user slides out of the operation range of the virtual item button, re-slides into the operation range of the virtual item button and slides towards the preset direction, in case that a parameter of a slide operation conforms to the preset parameter, transferring the virtual item;

if it is detected that the finger of the user slides out of the operation range of the virtual item button and the finger is released, determining as an invalid operation.

In some embodiments, after the in response to the operation where the finger of the user slides from the operation range of the virtual item button towards the preset direction, and that the parameter of slide operation conforms to the preset parameter, transferring the virtual item, the solution further includes:

hiding the prompt information and an icon of the virtual item corresponding to the virtual item button.

Through the above embodiments, the user merely performs one slide operation to achieve the transfer of the virtual item, and the slide operation is from the operation range of the virtual item button towards the preset direction. Thus, compared with displaying two interfaces on the terminal device at the same time and dragging the virtual item from one interface to another storage space, the finger of the user moves less distance and there is no need to display two interfaces. For the user, the operation is simple and less frequent, which may also reduce the complexity of the operation when a large number of virtual items need to be transferred.

The electronic device according to the embodiments of the present disclosure may be used to implement the technical solution of the method for processing the virtual item in the above embodiments, and implementations and technical effects of the apparatus are similar to those of the method, which is not repeated herein.

The embodiments of the present disclosure also provide a chip for running instructions, and the chip is configured to implement the technical solution of the method for processing the virtual item in the above embodiments.

The embodiments of the present disclosure also provide a computer-readable storage medium having computer instructions stored thereon, where when the computer instructions are running on the computer, the computer performs the technical solution of the method for processing the virtual item in the above embodiments:

displaying a virtual item button for controlling the virtual item in the storage space interface;

displaying prompt information of the virtual item button; where the prompt information is configured to prompt a user to slide from an operation range of the virtual item button towards a preset direction, to transfer the virtual item corresponding to the virtual item button from a current storage space to another storage space; and in response to an operation where a finger of the user slides from the operation range of the virtual item button towards the preset direction, and that a parameter of a slide operation conforms to a preset parameter, transferring the virtual item.

In some embodiments, the prompt information includes an icon, the icon is arranged within the operation range of the virtual item button, the preset direction is a target direction or a direction whose an included angle with the target direction is less than a preset angle, and the target direction is a direction of the icon relative to a center of the virtual item button.

In some embodiments, the prompt information includes an animated image, and the animated image is arranged within the operation range of the virtual item button for showing an action of sliding towards the preset direction.

In some embodiments, the prompt information includes text, and the text is arranged outside the operation range of the virtual item button.

In some embodiments, the preset parameter includes any one of a preset slide track, a preset slide duration or a preset slide distance;

accordingly, where the in response to the operation where the finger of the user slides from the operation range of the virtual item button towards the preset direction, and that the parameter of the slide operation conforms to the preset parameter, transferring the virtual item includes:

in response to the operation where the finger of the user slides from the operation range of the virtual item button towards the preset direction, and that a slide track conforms to the preset slide track, transferring the virtual item;

or in response to the operation where the finger of the user slides from the operation range of the virtual item button towards the preset direction, and that a slide duration is greater than or equal to the preset slide duration, transferring the virtual item;

or in response to the operation where the finger of the user slides from the operation range of the virtual item button towards the preset direction, and that a slide distance is greater than or equal to the preset slide distance, transferring the virtual item.

In some embodiments, the solution further includes:

acquiring a pressing duration of the user on the virtual item button;

if the pressing duration is greater than or equal to a preset duration, displaying the prompt information of the virtual item button;

if the pressing duration is less than the preset duration, not displaying the prompt information of the virtual item button.

In some embodiments, the solution further includes:

if it is detected that the finger of the user slides out of the operation range of the virtual item button, re-slides into the operation range of the virtual item button and slides towards the preset direction, in case that a parameter of a slide operation conforms to the preset parameter, transferring the virtual item;

if it is detected that the finger of the user slides out of the operation range of the virtual item button and the finger is released, determining as an invalid operation.

In some embodiments, after the in response to the operation where the finger of the user slides from the operation range of the virtual item button towards the preset direction, and that the parameter of slide operation conforms to the preset parameter, transferring the virtual item, the solution further includes:

hiding the prompt information and an icon of the virtual item corresponding to the virtual item button.

Through the above embodiments, the user merely performs one slide operation to achieve the transfer of the virtual item, and the slide operation is from the operation range of the virtual item button towards the preset direction. Thus, compared with displaying two interfaces on the terminal device at the same time and dragging the virtual item from one interface to another storage space, the finger of the user moves less distance and there is no need to display two interfaces. For the user, the operation is simple and less frequent, which may also reduce the complexity of the operation when a large number of virtual items need to be transferred.

The method and apparatus for processing the virtual item, device, and storage medium according to the present disclosure are provided by the present disclosure, the graphical user interface including the virtual item is displayed on the terminal device, the virtual item button for controlling the virtual item is displayed on the storage space interface and the prompt information of the virtual item button is displayed, the prompt information is configured to prompt a user to slide from an operation range of the virtual item button towards a preset direction, to transfer the virtual item corresponding to the virtual item button from a current storage space to another storage space, and in case of detecting an operation where a finger of the user slides from the operation range of the virtual item button towards the preset direction, and that a parameter of a slide operation conforms to a preset parameter, the virtual item is transferred. In the embodiment of the present disclosure, the user merely performs one slide operation to achieve the transfer of the virtual item, and the slide operation is from the operation range of the virtual item button towards the preset direction. Thus, compared with displaying two interfaces on the terminal device at the same time and dragging the virtual item from one interface to another storage space, the finger of the user moves less distance and there is no need to display two interfaces. For the user, the operation is simple and less frequent, which may also reduce the complexity of the operation when a large number of virtual items need to be transferred.

The embodiments of the present disclosure also provide a computer program product, and the computer program product includes a computer program stored in a computer-readable storage medium, at least one processor may read the computer program from the computer-readable storage medium, and the at least one processor may implement the technical solution of the method for processing the virtual item in the above embodiments when executing the computer program.

Finally, it should be noted that the above embodiments are merely used for illustrating technical solutions of the present disclosure and are not intended to be limiting thereof. While the present disclosure has been described in detail with reference to the foregoing embodiments, it will be understood by those skilled in the art that, it is still possible to modify the technical solutions recited in the foregoing embodiments or to equivalently replace some or all of the technical features therein, and that these modifications or replacements do not make essence of corresponding technical solutions depart from the scope of technical solutions of the embodiments of the present disclosure.

What is claimed is:

1. A method for processing a virtual item, comprising:
displaying a graphical user interface on a terminal device, wherein the graphical user interface comprises a storage space interface of the virtual item;
displaying a virtual item button for controlling the virtual item in the storage space interface;
displaying prompt information of the virtual item button; wherein the prompt information is configured to prompt a user to slide from an operation range of the virtual item button towards a preset direction, to transfer the virtual item corresponding to the virtual item button from a current storage space to another storage space; and
in response to detecting a slide operation where a finger of the user slides from the operation range of the virtual item button towards the preset direction, and in response to determining that a parameter of the slide operation conforms to a preset parameter, transferring the virtual item.

2. The method according to claim 1, wherein the prompt information comprises an icon, the icon is arranged within the operation range of the virtual item button, the preset direction is a target direction or a direction whose an included angle with the target direction is less than a preset angle, and the target direction is a direction of the icon relative to a center of the virtual item button.

3. The method according to claim 1, wherein the prompt information comprises an animated image, and the animated image is arranged within the operation range of the virtual item button for showing an action of sliding towards the preset direction.

4. The method according to claim 1, wherein the prompt information comprises text, and the text is arranged outside the operation range of the virtual item button.

5. The method according to claim 1, wherein the preset parameter comprises a preset slide track;
wherein in response to detecting the slide operation where the finger of the user slides from the operation range of the virtual item button towards the preset direction, and in response to determining that the parameter of the slide operation conforms to the preset parameter, transferring the virtual item comprises:
in response to detecting the slide operation where the finger of the user slides from the operation range of the virtual item button towards the preset direction, and in response to determining that a slide track conforms to the preset slide track, transferring the virtual item.

6. The method according to claim 5, further comprising:
acquiring a pressing duration applied by the user on the virtual item button;
in response to determining that the pressing duration is greater than or equal to a preset duration, displaying the prompt information of the virtual item button;
in response to determining that the pressing duration is less than the preset duration, not displaying the prompt information of the virtual item button.

7. The method according to claim 1, further comprising:
in response to detecting that the finger of the user slides out of the operation range of the virtual item button, re-slides into the operation range of the virtual item button and slides towards the preset direction, and in response to determining that a parameter of a slide operation conforms to the preset parameter, transferring the virtual item;
in response to detecting an operation where the finger of the user slides out of the operation range of the virtual item button and the finger is released, determining the operation as an invalid operation.

8. The method according to claim 2, further comprising:
hiding the prompt information and an icon of the virtual item corresponding to the virtual item button.

9. The method according to claim 1, wherein the preset parameter comprises a preset slide duration;
wherein in response to detecting the slide operation where the finger of the user slides from the operation range of the virtual item button towards the preset direction, and in response to determining that the parameter of the slide operation conforms to the preset parameter, transferring the virtual item comprises:
in response to detecting the slide operation where the finger of the user slides from the operation range of the virtual item button towards the preset direction, and in response to determining that a slide duration is greater than or equal to the preset slide duration, transferring the virtual item.

10. The method according to claim 9, wherein the slide duration is equal to a slide distance divided by a slide speed; wherein the slide speed is an average value of the slide speeds of a plurality of users, and the slide distance is a distance between a location of an initial touch point and a location of a current touch point of the finger of the user on the storage space interface of the terminal device.

11. The method according to claim 1, wherein the preset parameter comprises a preset slide distance;
wherein in response to detecting the slide operation where the finger of the user slides from the operation range of the virtual item button towards the preset direction, and in response to determining that the parameter of the slide operation conforms to the preset parameter, transferring the virtual item comprises:
in response to detecting the slide operation where the finger of the user slides from the operation range of the virtual item button towards the preset direction, and in response to determining that a slide distance is greater than or equal to the preset slide distance, transferring the virtual item.

12. An electronic device, comprising a processor, a memory configured to store executable instructions of the processor, and an interactive interface;

wherein when performing the executable instructions, the processor is configured to:

display a graphical user interface on a terminal device, wherein the graphical user interface comprises a storage space interface of the virtual item;

display a virtual item button for controlling the virtual item in the storage space interface;

display prompt information of the virtual item button; wherein the prompt information is configured to prompt a user to slide from an operation range of the virtual item button towards a preset direction, to transfer the virtual item corresponding to the virtual item button from a current storage space to another storage space; and in response to detecting a slide operation where a finger of the user slides from the operation range of the virtual item button towards the preset direction, and in response to determining that a parameter of the slide operation conforms to a preset parameter, transfer the virtual item.

13. The electronic device according to claim 12, wherein the prompt information comprises an icon, the icon is arranged within the operation range of the virtual item button, the preset direction is a target direction or a direction whose an included angle with the target direction is less than a preset angle, and the target direction is a direction of the icon relative to a center of the virtual item button.

14. The electronic device according to claim 12, wherein the prompt information comprises an animated image, and the animated image is arranged within the operation range of the virtual item button for showing an action of sliding towards the preset direction.

15. The electronic device according to claim 12, wherein wherein the prompt information comprises text, and the text is arranged outside the operation range of the virtual item button.

16. The electronic device according to claim 12, wherein the preset parameter comprises a preset slide track; the processor is further configured to:

in response to detecting the slide operation where the finger of the user slides from the operation range of the virtual item button towards the preset direction, and in response to determining that a slide track conforms to the preset slide track, transfer the virtual item.

17. A non-transitory computer-readable storage medium having computer execution instructions stored thereon, wherein when executing the computer execution instructions, the processor is configured to:

display a graphical user interface on a terminal device, wherein the graphical user interface comprises a storage space interface of the virtual item;

display a virtual item button for controlling the virtual item in the storage space interface;

display prompt information of the virtual item button; wherein the prompt information is configured to prompt a user to slide from an operation range of the virtual item button towards a preset direction, to transfer the virtual item corresponding to the virtual item button from a current storage space to another storage space; and in response to detecting a slide operation where a finger of the user slides from the operation range of the virtual item button towards the preset direction, and in response to determining that a parameter of the slide operation conforms to a preset parameter, transfer the virtual item.

18. The non-transitory computer-readable storage medium according to claim 17, wherein the prompt information comprises an icon, the icon is arranged within the operation range of the virtual item button, the preset direction is a target direction or a direction whose an included angle with the target direction is less than a preset angle, and the target direction is a direction of the icon relative to a center of the virtual item button.

19. The non-transitory computer-readable storage medium according to claim 17, wherein the prompt information comprises an animated image, and the animated image is arranged within the operation range of the virtual item button for showing an action of sliding towards the preset direction.

20. The non-transitory computer-readable storage medium according to claim 17, wherein wherein the prompt information comprises text, and the text is arranged outside the operation range of the virtual item button.

* * * * *